United States Patent [19]
Keller

[11] 3,845,367
[45] Oct. 29, 1974

[54] INTEGRATED CIRCUIT FOR ELECTRONIC CLOCKS

[75] Inventor: Hans Keller, Freiburg, Germany

[73] Assignee: ITT Industries, Inc., New York, N.Y.

[22] Filed: Apr. 11, 1973

[21] Appl. No.: 350,269

[30] Foreign Application Priority Data
May 6, 1972 Germany .......... 2222298

[52] U.S. Cl. .......... 318/127, 318/129, 318/132
[51] Int. Cl. .......... H02p 5/16
[58] Field of Search .......... 318/1, 2, 3, 4, 5, 6–10

[56] References Cited
UNITED STATES PATENTS

| | | | |
|---|---|---|---|
| 2,013,542 | 9/1935 | Nordmark | 108/5 X |
| 3,124,731 | 3/1964 | Eysen et al. | 318/132 |
| 3,491,531 | 1/1970 | Wiesner | 318/132 |
| 3,594,621 | 7/1971 | Stechmann | 318/132 |
| 3,733,531 | 5/1973 | Stechmann | 318/132 |

*Primary Examiner*—L. T. Hix
*Attorney, Agent, or Firm*—John T. O'Halloran; Menotti J. Lombardi, Jr.; Edward Goldberg

[57] ABSTRACT

This relates to a transistorized switching amplifier including an operating coil, a control coil, an amplifying transistor, a stabilizing transistor and a voltage divider.

To reduce current consumption, this case proposes the use of a third transistor having an emitter coupled to one terminal of the voltage divider, a collector coupled to the positive pole of the supply voltage and a base connected to the base of the amplifying transistor is employed.

5 Claims, 3 Drawing Figures

INTEGRATED CIRCUIT FOR ELECTRONIC CLOCKS

BACKGROUND OF THE INVENTION

The present invention relates to an integrated semiconductor solid-state circuit for a transistorized switching amplifier, in particular for use in automatically controlled clockworks.

The circuit comprises a source of d.c. voltage of the non-constant type which is arranged in the operating circuit of the transistor amplifier, in particular a dry battery or an accumulator to storage battery as the source of energy, with a control winding arranged between the base and the emitter, and an operating winding arranged between the emitter and reference potential. A mechanically oscillating or rotating system periodically causes switching pulses in the control winding which, via the transistor and the operating winding, are amplified and fed to the mechanical system. A stabilizing transistor having a collector electrode for suppressing unwanted refluxes, via a diode is connected to the base of the transistor, and the emitter thereof is applied to reference potential. The base electrode of the stabilizing transistor is connected to the tapping point of an ohmic voltage divider arranged in parallel with the operating winding.

There is known a circuit arrangement wherein besides the two windings, i.e. the operating winding $L_1$ and the control winding $L_2$, all further circuit elements are assembled to form an integrated semiconductor circuit. This integrated semiconductor circuit is so designed that the transistorized amplifier $T_1$ with its collector is directly connected to the plus pole of the source of direct voltage $U_0$ while from the emitter thereof, the operating winding $L_1$ extends to reference potential, and the control winding $L_2$ extends to the base thereof, with the operating winding $L_1$ being arranged in parallel with the voltage divider consisting of resistors $R_1$, $R_2$. The stabilizing transistor $T_2$ is applied with its emitter to reference potential, with its base to the tapping point of voltage divider and, with its collector, via the diode D, to the base of the transistorized amplifier $T_1$.

This integrated semiconductor circuit has proved particularly suitable for the use in large clocks, i.e. in wall-mounted and alarm clocks, and has gained wide acceptance in the market. The use of the circuit in smaller clocks or watches, accordingly requiring a smaller volume and, consequently, a smaller capacity of the dry cell battery or accumulator respectively, however, is opposed by the disadvantage that owing to the voltage divider arranged in parallel with the operating winding $L_1$, energy is withdrawn from the electromagnetic balance-wheel system during the time in which voltage is induced in the winding, in other words: the voltage divider has an attenuating (damping) effect upon the operating winding.

SUMMARY OF THE INVENTION

It is the object of the invention to modify the integrated semiconductor circuit described above in such a way that the entire driving system will consume less current.

According to a broad aspect of the invention there is provided an integrated solid-state transistorized switching amplifier for use in electronically controlled watch circuits comprising a d.c. voltage source having a voltage conducting pole and a zero pole, an amplifying transistor having a base emitter and collector, said collector coupled to said voltage conducting pole, a control winding coupled between the base and emitter of said amplifying transistor, an operating winding coupled between the emitter of said amplifying transistor and said zero pole, means for causing switching pulses in said control winding, an ohmic voltage divider comprising first and second resistors arranged in parallel to said operating winding having first and second terminals and a center junction, said first terminal coupled to said zero point, a stabilizing transistor having an emitter coupled to said zero pole, a base coupled to said center junction, and a collector, a diode and a further transistor having an emitter coupled to said second terminal, a collector coupled to said voltage conducting pole and a base coupled to the base of said amplifying transistor and via said diode, to the collector of said stabilizing transistor.

It is considered an advantage to dimension the control of coil in such a way that the amplitude of the voltage as induced therein will not exceed 0.5 volt. The diode may then be replaced by a conducting connection when simultaneously the semiconductor body is not applied in the usual way to reference potential, but to the base of the transistorized amplifier.

In further embodying the invention, the resistors of the voltage divider may be deposited in the form of resistance leads either on the semiconductor body of the integrated semiconductor circuit, or may consist of regions of the semiconductor body itself. Moreover, in order to adapt the integrated semiconductor circuit to various battery voltages, it is of advantage if, for the purpose of adjusting the voltage divider ratio, at least one of the resistors of the voltage divider consists of several parallel- and/or series-connected partial resistors of which, quite depending on the existing voltage value of the source of d.c. voltage, at least one is open or short-circuited respectively. It is considered a particular advantage when the voltage-dividing ratio is adjusted in that the partial resistors which are either not to be connected or to be short-circuited, are arranged to come to lie below the openings of a metalized layer covering all of said partial resistors. Finally, there will result a substantial simplification of the inventive integrated semiconductor circuit when combining both the transistorized amplifier and the additional transistor in a double-emitter type of transistor.

The above and other objects of the present invention will be better understood from the following detailed description taken in conjunction with the accompanying drawings in which:

DESCRIPTION OF THE PREFERRED EMBODIMENT

Figure 1:
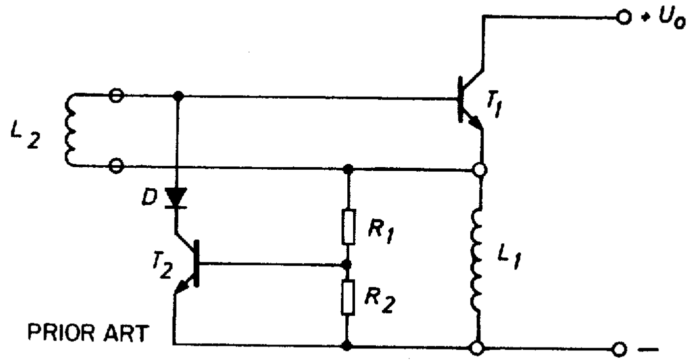
FIG. 1 shows an electrical circuit diagram of the known circuit.

FIG. 1 of the accompanying drawing shows the circuit arrangement wherein besides the two windings, i.e.

the operating winding $L_1$ and the control winding $L_2$, all further circuit elements are assembled to form an integrated semiconductor circuit. This integrated semiconductor circuit is so designed that the transistorized amplifier $T_1$ with its collector is directly connected to the plus pole of the source of direct voltage $U_0$ while from the emitter thereof, the operating winding $L_1$ extends to reference potential, and the control winding $L_2$ extends to the base thereof, with the operating winding $L_1$ being arranged in parallel with the voltage divider consisting of resistors $R_1$, $R_2$. The stabilizing transistor $T_2$ is applied with its emitter to reference potential, with its base to the tapping point of voltage divider and, with its collector, via the diode D, to the base of the transistorized amplifier $T_1$.

Figure 2:
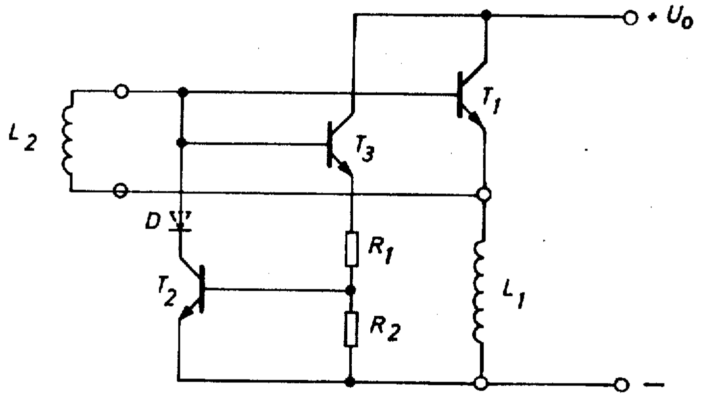
FIG. 2 shows the electrical circuit diagram of the integrated semiconductor circuit according to the invention.

According to the circuit diagram shown in FIG. 2, the integrated semiconductor circuit according to the invention, with the exception of the additional transistor $T_3$, consists of the same circuit elements or components as in the arrangement according to FIG. 1 where the diode D is indicated by the broken line in order to denote the aforementioned possibility of omission. The terminal of the voltage-dividing resistor $R_1$ which, according to FIG. 1 is connected to the emitter electrode of the transistorized amplifier $T_1$, is connected in accordance with the invention, to the emitter of the additional transistor $T_3$, with the base thereof being connected to the base of the transistorized amplifier $T_1$, and with the collector thereof being connected to the positive pole of the source of d.c. voltage $U_0$. In this way it is accomplished that the operating winding $L_1$ is no longer loaded by the voltage divider. To the terminal of the voltage dividing resistor $R_1$ and to the emitter of the additional transistor $T_3$, there is applied the same potential as in the arrangement according to FIG. 1, because the operating winding $L_1$ as well as the voltage divider $R_1$, with respect to the base of the transistorized amplifier $T_1$, are respectively preceded by the base-emitter path of a transistor with its constant threshold voltage.

Figure 3:
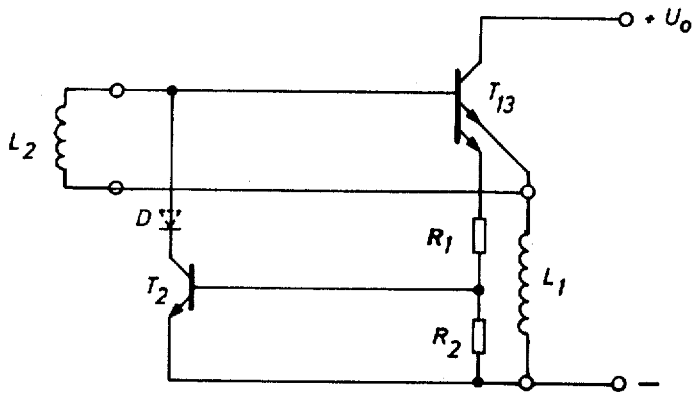
FIG. 3 shows the circuit diagram of the aforementioned further embodiment.

FIG. 3 shows the circuit diagram of the aforementioned further embodiment of the invention in which the transistorized amplifier $T_1$ and the additional transistor $T_3$ are combined to form the double-emitter type of transistor $T_{13}$.

The aforementioned optional replacement of the diode D in the case of a corresponding restriction of the amplitude of the voltage induced in the control coil to a maximum of 0.5 volt, on account of which the collector of the stabilizing transistor $T_2$ is connected directly to the base of the transistorized amplifier $T_1$ or of the double-emitter type of transistor $T_{13}$ respectively, is made possible in that the semiconductor body of the integrated semiconductor circuit is not connected, as usual, to reference potential, but to the base of the transistorized amplifier $T_1$ or to the base of the double-emitter type of transistor $T_{13}$, respectively. Owing to the thus possible saving of the diode D which, in the integrated semiconductor circuit, of course, is designed to have a transistor structure, the inventive circuit arrangement, in spite of the additional transistor $T_3$, requires no larger surface area.

It is to be understood that the foregoing description of specific examples of this invention is made by way of example only and is not to be considered as a limitation on its scope.

I claim:

1. An integrated solid-state transistorized switching amplifier for use in electronically-controlled watch circuits of the type wherein a mechanically oscillating system induces switching pulses in a control winding, comprising:
   - a d.c. voltage source having a voltage conducting pole and a zero pole;
   - an amplifying transistor having a base, emitter, and collector, said collector coupled to said voltage conducting pole, said control winding coupled between said base and emitter of said amplifying transistor;
   - an operating winding coupled between the emitter of said amplifying transistor and said zero pole;
   - an ohmic voltage divider comprising first and second resistors arranged in parallel to said operating winding having first and second terminals and a center junction, said first terminal coupled to said zero point;
   - a stabilizing transistor having an emitter coupled to said zero pole, a base coupled to said center junction, and a collector;
   - a diode; and
   - a further transistor having an emitter coupled to said second terminal, a collector coupled to said voltage conducting pole and a base coupled to the base of said amplifying transistor and via said diode, to the collector of said stabilizing transistor.

2. An integrated solid-state transistorized switching amplifier according to claim 1 wherein said semiconductor body is connected to the base of said amplifying transistor.

3. An integrated solid-state transistorized switching amplifier according to claim 1 wherein the voltage induced in said control winding is not greater than 0.5 volts.

4. An integrated solid-state transistorized switching amplifier according to claim 1 wherein one of said first and second resistors of said voltage divider comprises a plurality of partial resistors.

5. An integrated solid-state transistorized switching amplifier for use in electronically-controlled watch circuits of the type wherein a mechanically oscillating system causes switching pulses in a control winding, comprising:
   - a d.c. voltage source having a voltage conducting pole and a zero pole;
   - an amplifying transistor having a base, first and second emitters, and collector, said collector coupled to said voltage conducting pole, said control winding coupled between the base and said first emitter;
   - an operating winding coupled between said first emitter and said zero pole;
   - an ohmic voltage divider comprising first and second resistors arranged in parallel to said operating winding having first and second terminals and a center junction, said first terminal coupled to said zero point and said second terminal coupled to said second emitter;
   - a diode; and
   - a stabilizing transistor having an emitter coupled to said zero pole, a base coupled to said center junction and a collector coupled to the base of said amplifying transistor via said diode.

* * * * *